(12) United States Patent
Okada et al.

(10) Patent No.: US 12,350,624 B2
(45) Date of Patent: Jul. 8, 2025

(54) GAS SEPARATION METHOD AND APPARATUS

(71) Applicant: Renaissance Energy Research Corporation, Kyoto (JP)

(72) Inventors: Osamu Okada, Kyoto (JP); Nobuaki Hanai, Kyoto (JP)

(73) Assignee: Renaissance Energy Research Corporation, Kyoto (JP)

( * ) Notice: Subject to any disclaimer, the term of this patent is extended or adjusted under 35 U.S.C. 154(b) by 465 days.

(21) Appl. No.: 17/928,494

(22) PCT Filed: May 10, 2021

(86) PCT No.: PCT/JP2021/017698
§ 371 (c)(1),
(2) Date: Nov. 29, 2022

(87) PCT Pub. No.: WO2022/009514
PCT Pub. Date: Jan. 13, 2022

(65) Prior Publication Data
US 2023/0201762 A1 Jun. 29, 2023

(30) Foreign Application Priority Data

Jul. 6, 2020 (JP) .................................. 2020-116094

(51) Int. Cl.
*B01D 53/22* (2006.01)
*B01D 69/02* (2006.01)
(Continued)

(52) U.S. Cl.
CPC ........... *B01D 53/228* (2013.01); *B01D 69/02* (2013.01); *B01D 69/1213* (2022.08);
(Continued)

(58) Field of Classification Search
CPC .. B01D 53/228; B01D 69/02; B01D 69/1213; B01D 69/1216; B01D 71/261;
(Continued)

(56) References Cited

U.S. PATENT DOCUMENTS 5,082,472 A * 1/1992 Mallouk ............ B01D 69/1212
95/49
5,925,168 A * 7/1999 Judkins ................ B01D 53/047
96/108
(Continued)

FOREIGN PATENT DOCUMENTS

JP 2011183379 A 9/2011
JP 2015024372 A 2/2015
(Continued)

*Primary Examiner* — Stephen Hobson
(74) *Attorney, Agent, or Firm* — Andrew L. Dunlap; Haynes Beffel & Wolfeld LLP

(57) ABSTRACT

A gas separation method is provided. The method includes using a gas separation apparatus comprising a selective permeable membrane and a first and second treatment chambers separated by the selective permeable membrane. A mixed gas containing a gas to be separated is supplied into (or generated within) the first treatment chamber, and the gas to be separated is separated from the mixed gas by having the gas to be separated permeate from the first/second treatment chamber side of the selective permeable membrane, which has a stacked laminated structure of a hydrophilic porous membrane, a separation-functional layer, and a first protective membrane, and the separation-functional layer includes a layer of hydrophilic polymer containing water, and the first treatment chamber is provided on a hydrophilic porous membrane side of the selective permeable membrane and the second treatment chamber is provided on the first protective membrane side of the selective permeable membrane.

16 Claims, 6 Drawing Sheets

(51) Int. Cl.
- *B01D 69/12* (2006.01)
- *B01D 71/26* (2006.01)
- *B01D 71/34* (2006.01)
- *B01D 71/40* (2006.01)
- *B01D 71/42* (2006.01)
- *B01D 71/44* (2006.01)
- *B01D 71/50* (2006.01)
- *B01D 71/64* (2006.01)

(52) U.S. Cl.
CPC ....... *B01D 69/1216* (2022.08); *B01D 71/261* (2022.08); *B01D 71/262* (2022.08); *B01D 71/34* (2013.01); *B01D 71/401* (2022.08); *B01D 71/421* (2022.08); *B01D 71/441* (2022.08); *B01D 71/50* (2013.01); *B01D 71/64* (2013.01); *B01D 2053/221* (2013.01); *B01D 2257/504* (2013.01); *B01D 2325/10* (2013.01); *B01D 2325/20* (2013.01); *B01D 2325/36* (2013.01); *B01D 2325/38* (2013.01)

(58) Field of Classification Search
CPC .... B01D 71/262; B01D 71/34; B01D 71/401; B01D 71/421; B01D 71/441; B01D 71/50; B01D 71/64; B01D 2053/221; B01D 2257/504; B01D 2325/10; B01D 2325/20; B01D 2325/36; B01D 2325/38; B01D 69/10; B01D 2325/50; Y02C 20/04
See application file for complete search history.

(56) References Cited

U.S. PATENT DOCUMENTS

| | | | | |
|---|---|---|---|---|
| 8,043,418 B2 * | | 10/2011 | Ruud | B01D 71/0281 96/14 |
| 9,827,535 B2 * | | 11/2017 | Okada | B01D 53/268 |
| 9,839,882 B2 * | | 12/2017 | Aburaya | B01D 53/228 |
| 10,763,021 B1 * | | 9/2020 | Parisien | H01F 7/064 |
| 2007/0004023 A1 * | | 1/2007 | Trachtenberg | B01D 63/026 435/297.2 |
| 2007/0151447 A1 * | | 7/2007 | Merkel | B01D 71/80 95/52 |
| 2008/0011161 A1 * | | 1/2008 | Finkenrath | B01D 53/22 96/4 |
| 2008/0127632 A1 * | | 6/2008 | Finkenrath | B01D 53/62 60/274 |
| 2011/0036237 A1 * | | 2/2011 | Okada | B01D 69/107 427/244 |
| 2012/0297976 A1 * | | 11/2012 | Sano | B32B 3/14 95/47 |
| 2013/0014642 A1 * | | 1/2013 | Sano | C08F 212/26 96/5 |
| 2013/0122382 A1 * | | 5/2013 | Mizuhata | H01M 8/0668 205/765 |
| 2013/0199370 A1 * | | 8/2013 | Okada | B01D 61/363 95/52 |
| 2013/0287678 A1 * | | 10/2013 | Okada | B01D 53/226 422/162 |
| 2014/0099245 A1 * | | 4/2014 | Hamad | B01D 53/62 96/242 |
| 2014/0260986 A1 * | | 9/2014 | Ishizuka | B01D 71/421 96/13 |
| 2014/0290479 A1 * | | 10/2014 | Okada | C01B 3/38 96/9 |
| 2015/0086801 A1 * | | 3/2015 | Hiraki | B01J 20/321 427/374.1 |
| 2015/0151243 A1 * | | 6/2015 | Okada | B01D 71/76 252/190 |
| 2015/0182917 A1 * | | 7/2015 | Hosoya | B01D 63/12 422/212 |
| 2016/0008765 A1 * | | 1/2016 | Aburaya | B01D 69/1214 96/11 |
| 2016/0008766 A1 * | | 1/2016 | Aburaya | B01D 71/401 524/556 |
| 2016/0008767 A1 * | | 1/2016 | Yoneyama | B01D 53/228 427/245 |
| 2016/0008768 A1 * | | 1/2016 | Yoneyama | B01D 69/1071 427/245 |
| 2016/0051938 A1 * | | 2/2016 | Okada | B01D 71/80 423/230 |
| 2017/0043301 A1 * | | 2/2017 | Berzinis | B01D 71/5223 |
| 2017/0072371 A1 * | | 3/2017 | Hayashi | B01D 71/441 |
| 2017/0232398 A1 * | | 8/2017 | Ota | B01D 53/228 95/51 |
| 2018/0141006 A1 * | | 5/2018 | Van Gestel | B01D 67/0044 |
| 2018/0280892 A1 * | | 10/2018 | Harada | B01D 69/02 |
| 2019/0060826 A1 * | | 2/2019 | Okada | B01D 69/06 |
| 2019/0083926 A1 * | | 3/2019 | Kitaura | B01D 71/381 |
| 2019/0291060 A1 * | | 9/2019 | Mochizuki | B01D 53/228 |
| 2020/0061530 A1 * | | 2/2020 | Takemoto | B01D 53/228 |
| 2020/0122090 A1 * | | 4/2020 | Kitaura | B01D 69/02 |
| 2020/0239797 A1 * | | 7/2020 | Okada | B01D 69/00 |
| 2020/0261859 A1 * | | 8/2020 | Shinohara | B01D 69/1216 |
| 2020/0282379 A1 * | | 9/2020 | Mulet | B01J 20/103 |
| 2021/0001280 A1 * | | 1/2021 | Inamoto | B01D 67/00113 |
| 2021/0008491 A1 * | | 1/2021 | Okada | B01D 71/06 |
| 2021/0364453 A1 * | | 11/2021 | Sano | G01N 23/046 |
| 2022/0134307 A1 * | | 5/2022 | Sadiq | C09D 7/60 95/108 |
| 2024/0325968 A1 * | | 10/2024 | Kawara | B01D 67/0002 |

FOREIGN PATENT DOCUMENTS

| | | |
|---|---|---|
| WO | 2009093666 A1 | 7/2009 |
| WO | 2012086836 A1 | 6/2012 |
| WO | 2014054619 A1 | 4/2014 |
| WO | 2016024523 A1 | 2/2016 |
| WO | 2019130470 A1 | 7/2019 |

* cited by examiner

GAS SEPARATION METHOD AND APPARATUS

TECHNICAL FIELD

The present invention relates to a gas separation method and apparatus for separating a gas to be separated from a mixed gas containing the gas to be separated by using a selective permeable membrane provided with a separation-functional layer that is selectively permeable to the gas to be separated, and more particularly, to a gas separation method and apparatus in which the selective permeable membrane has a laminated structure with a hydrophilic porous membrane, a separation-functional layer formed of a gel layer of a hydrophilic polymer containing water formed on the hydrophilic porous membrane, and a hydrophobic porous membrane laminated on the separation-functional layer being stacked in order.

BACKGROUND ART

When a separation-functional layer consisting of a gel layer of a hydrophilic polymer is formed on a supporting membrane, a cast solution consisting of an aqueous solution containing the hydrophilic polymer is coated onto the supporting membrane and then gelled. Here, there are two methods of using a hydrophobic porous membrane and a hydrophilic porous membrane as the supporting membrane (for example, see Patent Documents 1 and 2 below). Each of separation-functional layers disclosed in Patent Documents 1 and 2 below is a facilitated $CO_2$ transport membrane including a $CO_2$ carrier, which is a compound that selectively reacts with carbon dioxide, which is a gas to be separated, in a gel layer of a hydrophilic polymer containing water.

PRIOR ART DOCUMENTS

Patent Documents

PATENT DOCUMENT 1: WO2016/024523
PATENT DOCUMENT 2: WO2009/093666

SUMMARY OF THE INVENTION

Problems to be Solved by the Invention

When a hydrophobic porous membrane is used as the supporting membrane as disclosed in the above-mentioned Patent Document 1, since the wettability of the hydrophobic supporting membrane is poor, it is difficult to uniformly coat the cast solution on the supporting membrane, and the gel layer cannot be uniformly formed on the supporting membrane.

On the other hand, when a hydrophilic porous membrane is used as the supporting membrane as disclosed in the above-mentioned Patent Document 2, the cast solution can be uniformly coated on the supporting membrane, but the cast solution also flows into the pores of the supporting membrane. When the cast solution is gelled, a gel layer is formed not only on the surface of the supporting membrane but also in the pores. When a gas is supplied to the gel layer and pressurized to separate the gas, the gel layer formed on the surface further penetrates into the pores due to the pressure. Considering the proportion of the pore portions in the support membrane (porosity) and the situation in which the pore does not extend straight perpendicularly to the membrane surface but bends many times (bending rate), the gel layer that penetrates into the pores has a large resistance to gas permeation. Therefore, when the hydrophilic porous membrane is used as the supporting membrane, the permeability of the entire gel layer is lower than when the gel layer is formed only on the surface of the supporting membrane, and the gas permeance is lowered.

From the above, it can be said that while the hydrophilic porous membrane is excellent as a supporting membrane of the separation-functional layer in consideration of the film formability, the hydrophobic porous membrane is excellent in consideration of the gas-permeability performance.

In view of the foregoing problems, it is an object of the present invention to provide a gas separation method and apparatus capable of suppressing deterioration in the gas-permeability performance while maintaining the excellent film formability of a hydrophilic porous membrane.

Means for Solving the Problem

A gas separation method according to the present invention for achieving the above-mentioned object is a gas separation method comprising
  using a gas separation apparatus comprising a selective permeable membrane provided with a separation-functional layer that is selectively permeable to a gas to be separated, and a first treatment chamber and a second treatment chamber separated by the selective permeable membrane,
  supplying a mixed gas containing the gas to be separated to the first treatment chamber or generating the mixed gas in the first treatment chamber, and separating the gas to be separated from the mixed gas by having the gas to be separated permeate from a first treatment chamber side of the selective permeable membrane to a second treatment chamber side of the selective permeable membrane, wherein
  the selective permeable membrane has a laminated structure in which a hydrophilic porous membrane, the separation-functional layer supported by the hydrophilic porous membrane, and a first protective membrane of a hydrophobic porous membrane laminated on the separation-functional layer are stacked in order,
  the separation-functional layer includes a gel layer of a hydrophilic polymer containing water,
  the first treatment chamber is provided on a hydrophilic porous membrane side of the selective permeable membrane, and the second treatment chamber is provided on a first protective membrane side of the selective permeable membrane.

Furthermore, a gas separation apparatus according to the present invention for achieving the above-mentioned object is a gas separation apparatus comprising
  a selective permeable membrane provided with a separation-functional layer that is selectively permeable to a gas to be separated, and a first treatment chamber and a second treatment chamber separated by the selective permeable membrane, and
  being configured to supply a mixed gas containing the gas to be separated to the first treatment chamber or to generate the mixed gas in the first treatment chamber, and to separate the gas to be separated from the mixed gas by having the gas to be separated permeate from a first treatment chamber side of the selective permeable membrane to a second treatment chamber side of the selective permeable membrane, wherein the selective permeable membrane has a laminated structure in which a hydrophilic porous membrane, the separation-functional layer supported by the hydrophilic porous membrane, and a first protective membrane of a hydrophobic porous membrane laminated on the separation-functional layer are stacked in order, the separation-functional layer includes a gel layer of a hydrophilic polymer containing water, the first treatment chamber is provided on a hydrophilic porous membrane side with respect to the separation-functional layer of the selective permeable membrane, and the second treatment chamber is provided on a first protective membrane side with respect to the separation-functional layer of the selective permeable membrane.

In order to obtain a partial pressure difference of the gas to be separated, which is a driving force for the gas to be separated to permeate the separation-functional layer from the first treatment chamber side toward the second treatment chamber side, the pressure on the first treatment chamber side is higher than the pressure on the second treatment chamber side. According to the gas separation method and apparatus having the above-mentioned features, the gel layer formed on the surface of the hydrophilic porous membrane does not penetrate into the pores of the hydrophilic porous membrane due to the pressure difference between the first and second treatment chambers described above because the hydrophilic porous membrane is disposed on the first treatment chamber side with respect to the separation-functional layer. In other words, it is possible to prevent deterioration in the gas permeability caused by the penetration of the gel layer into the pores of the hydrophilic porous membrane. Furthermore, since the first protective membrane is made of the hydrophobic porous membrane and the gel layer contains water, the penetration of the gel layer formed on the hydrophilic porous membrane into the pores of the first protective membrane due to the above-mentioned pressure difference is also prevented. As a result, it is possible to suppress deterioration in the gas permeability while maintaining the excellent film formability of a hydrophilic porous membrane, and it is possible to solve the problem of using a hydrophilic porous membrane as a supporting membrane and the problem of using a hydrophobic porous membrane at a time.

The "gel layer of a hydrophilic polymer containing water" in the gas separation method and apparatus having the above-mentioned features means that regardless of whether the gas separation apparatus is in a used state for gas separation or in a non-used state for gas separation (for example, in a storage state), the gel layer of the separation-functional layer contains water in an amount corresponding to the temperature and humidity in the respective states.

Furthermore, in the gas separation method and apparatus having the above-mentioned features, it is preferable that the first treatment chamber side of the hydrophilic porous membrane is covered with a second protective membrane made of a hydrophobic porous membrane. As a result, it is possible to prevent water droplets from adhering to the gel layer through the hydrophilic porous membrane and deteriorating the membrane performance.

Furthermore, in the gas separation method and apparatus having the above-mentioned features, it is preferable that the hydrophobic porous membrane includes at least any one of polytetrafluoroethylene, polyethersulfone, polypropylene, polyethylene, polyacrylonitrile, polysulfone, polyethersulfone, polyimide, and polyvinylidene fluoride.

Furthermore, in the gas separation method and apparatus having the above-mentioned features, it is preferable that the hydrophilic porous membrane includes at least any one of polycarbonate, a polycellulose-ester, polyether-ether-ketone, and the hydrophobic porous membrane with hydrophilic treatment.

Furthermore, in the gas separation method and apparatus having the above-mentioned features, it is preferable that the hydrophilic polymer is a polymer including polyacrylic acid as a main component.

Furthermore, in the gas separation method and apparatus having the above-mentioned features, it is preferable that the gas to be separated is carbon dioxide, and the separation-functional layer is a facilitated $CO_2$ transport membrane including a $CO_2$ carrier that selectively reacts with carbon dioxide in the mixed gas in the gel layer.

Furthermore, in the gas separation method and apparatus having the above-mentioned features, it is preferable that a pressure difference between the first treatment chamber and the second treatment chamber is adjusted to be equal to or greater than 300 kPa. In the gas separation apparatus, it is preferable to comprise a pressure adjusting device that adjusts the pressure difference to be equal to or higher than 300 kPa. Here, the pressure difference is adjusted by adjusting the pressure in at least one of the first treatment chamber and the second treatment chamber.

Furthermore, in the gas separation apparatus having the above-mentioned features, it is preferable that an identification mark is provided on an outer side of a housing constituting the first treatment chamber and the second treatment chamber so that the first treatment chamber and the second treatment chamber can be distinguished from the outside.

Furthermore, in the gas separation apparatus having the above-mentioned features, it is preferable that the first treatment chamber includes a catalyst for advancing a reaction of generating the mixed gas containing the gas to be separated from a source gas supplied to the first treatment chamber.

Effect of the Invention

According to the gas separation method and apparatus having the above-mentioned features, it is possible to suppress deterioration in the gas permeability while maintaining the excellent film formability of a hydrophilic porous membrane, and it is possible to solve the problem in the case of using a hydrophilic porous membrane as a supporting membrane and the problem in the case of using a hydrophobic porous membrane at a time.

DESCRIPTION OF EMBODIMENT

An embodiment of the gas separation apparatus and the gas separation method according to the present invention (hereinafter, referred to as "the present separation apparatus" and "the present separation method" as appropriate) will be described with reference to the drawings.

[Configuration of the Present Separation Apparatus]

Figure 1:
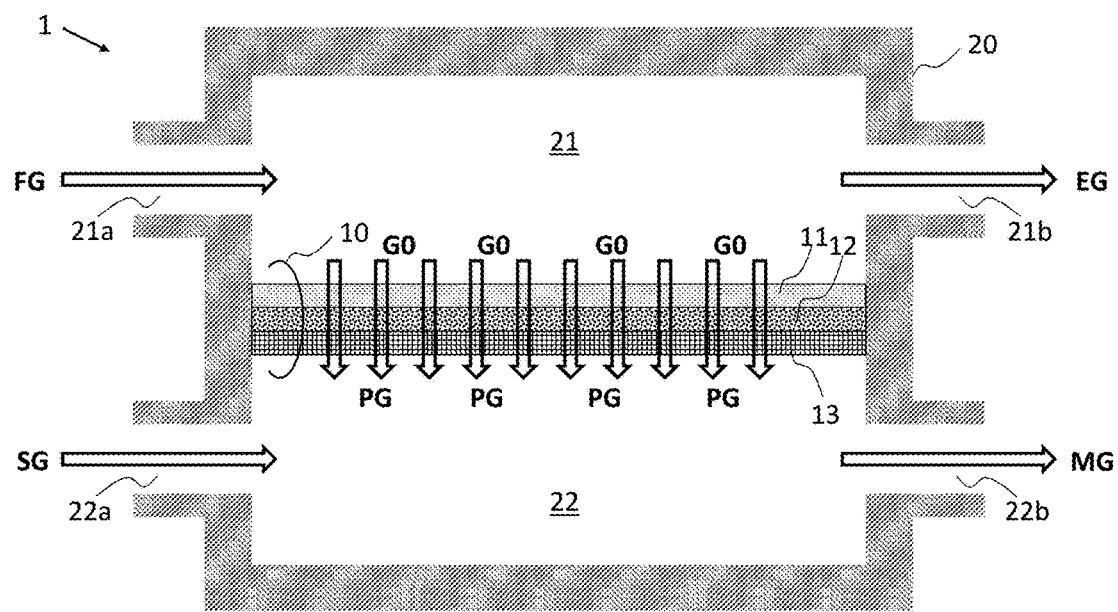
FIG. 1 is a cross-sectional view schematically illustrating a configuration of a gas separation apparatus according to an embodiment of the present invention.

FIG. 1 schematically shows a basic configuration of the present separation apparatus 1 with emphasis on the main parts. Therefore, the dimensional ratio of each component illustrated in FIG. 1 does not necessarily coincide with the actual dimensional ratio.

As shown in FIG. 1, in the present separation apparatus 1, a selective permeable membrane 10 of a flat membrane is placed in a housing 20, a space surrounded by the inner wall of the housing 20 and the supply side surface of the selective permeable membrane 10 forms the first treatment chamber 21, and a space surrounded by the inner wall of the housing 20 and the permeate side surface of the selective permeable membrane 10 forms the second treatment chamber 22. That is, the first treatment chamber 21 and the second treatment chamber 22 are separated by the selective permeable membrane 10. Therefore, the housing 20 is a housing forming the first treatment chamber 21 and the second treatment chamber 22.

The housing 20 is made of, for example, stainless steel. Although not illustrated, a fluoro-rubber gasket is interposed between the outer peripheral end of the selective permeable membrane 10 and the inner wall of the housing 20 as a sealing material to fix the selective permeable membrane 10 in the housing 20. The fixing method and the sealing method of the selective permeable membrane 10 are not limited to the above methods. In addition, a specific configuration for fixing the selective permeable membrane 10 in the housing 20 varies depending on the form of the selective permeable membrane 10 and the manner of placement in the housing 20.

The first treatment chamber 21 is provided with the first feeding port 21a for feeding a mixed gas FG containing a gas to be separated G0 into the first treatment chamber 21 from the outside, and the first discharge port 21b for discharging a post-treatment gas EG, which is the mixed gas after the gas to be separated G0 is separated, from the first treatment chamber 21 to the outside. Furthermore, although not illustrated, the first feeding port 21a is connected with a pipe for supplying the mixed gas FG into the first treatment chamber 21, and the first discharge port 21b is connected with a pipe for discharging the post-treatment gas EG from the first treatment chamber 21. Note that the open positions of the first feeding port 21a and the first discharge port 21b shown in FIG. 1 are examples and can be appropriately changed according to the shape of the first treatment chamber 21.

The second treatment chamber 22 is provided with the second feeding port 22a for feeding a sweep gas SG from the outside into the second treatment chamber 22, and the second discharge port 22b for discharging a discharge gas MG, in which a permeated gas PG containing the gas to be separated G0 that has permeated through the selective permeable membrane 10 and the sweep gas SG are mixed, from the second treatment chamber 22 to the outside. Furthermore, although not illustrated, the second feeding port 22a is connected with a pipe for supplying the sweep gas SG into the second treatment chamber 22, and the second discharge port 22b is connected with a pipe for discharging the discharge gas MG from the second treatment chamber 22. Note that the open positions of the second feeding port 22a and the second discharge port 22b shown in FIG. 1 are examples and can be appropriately changed according to the shape of the second treatment chamber 22.

In addition to the gas pipes, a device for mixing a plurality of gas species, a device for adjusting or measuring a gas flow rate, a device for adjusting a supply pressure of the gas, a device for adjusting a back pressure of the gas, a device for adding water vapor into the gas, a device for removing water in the gas, or the like are provided in each of the pipes as necessary.

The sweep gas SG is used for maintaining the driving force for the permeation through the selective permeable membrane 10 by lowering the partial pressure of the permeated gas PG containing the gas to be separated G0 that has permeated through the selective permeable membrane 10, and for discharging the permeated gas PG to the outside. However, if the partial pressure of the gas to be separated G0 is sufficiently high, it is not necessary to feed the sweep gas SG because a partial pressure difference serving as the driving force for permeation can be obtained even without flowing the sweep gas SG. Therefore, in the present separation apparatus 1, the sweep gas SG may be used as needed, and when the sweep gas SG is not used, the second treatment chamber 22 does not necessarily need to be provided with the second feeding port 22a. In the configuration illustrated in FIG. 1, it is assumed that the sweep gas SG is used. In addition, the position of the second discharge port 22b may be moved to the position where the second feeding port 22a is provided. Furthermore, even when using the sweep gas SG, the position of the second feeding port 22a and the position of the second discharge port 22b may be reversed. In this case, the direction in which the mixed gas FG flows in the first treatment chamber 21 is opposite to the direction in which the permeated gas PG or the discharge gas MG flows in the second treatment chamber 22. In addition, as the gas species used in sweep gas SG, $H_2O$ (steam) may be used as in the evaluation experiment of the membrane performance of the selective permeable membrane 10 to be described later, and furthermore, an inert gas such as Ar or a mixed gas of steam and an inert gas may be used, and the sweep gas SG is not limited to a particular gas species.

As shown in FIG. 1, the selective permeable membrane 10 has a laminated structure in which a hydrophilic porous membrane 11, a separation-functional layer 12, and a first protective membrane 13 are stacked in order. The separation-functional layer 12 is a layer selectively permeable to the gas to be separated G0, and in the present embodiment, includes a compound (gas carrier) that selectively reacts with the gas to be separated G0 in a gel layer of a hydrophilic polymer containing water, as an example, and functions as a facilitated transport membrane.

The hydrophilic porous membrane 11 is a base material for coating a cast solution made of an aqueous solution containing a hydrophilic polymer in the step of forming the gel layer of the separation-functional layer 12, and functions as a supporting membrane for supporting the gel layer obtained by gelling the hydrophilic polymer in the cast solution.

The first protective membrane 13 is a protective film that protects the exposed surface of the separation-functional layer 12 and is formed by laminating a hydrophobic porous membrane on the exposed surface of the separation-functional layer 12 in the present embodiment.

As the hydrophilic polymer constituting the separation-functional layer 12, polyvinyl alcohol-polyacrylic acid (PVA/PAA) salt copolymer, polyvinyl alcohol, polyacrylic acid, chitosan, polyvinylamine, polyallylamine, polyvinylpyrrolidone, or the like is assumed to be used. Particularly, a hydrophilic polymer containing polyacrylic acid as a main component is preferably used. Furthermore, the gel layer of the hydrophilic polymer may be a hydrogel. The hydrogel is a three-dimensional network formed by crosslinking hydrophilic polymers, and often has a nature of swelling by absorbing water. When the hydrophilic polymer is PVA/PAA salt copolymer or polyvinyl alcohol, the degree of crosslinking of the hydrogel can be adjusted by the additive amount of crosslinking agent such as a dialdehyde compound like glutaraldehyde, and an aldehyde compound like formaldehyde. PVA/PAA salt copolymer may occasionally be referred to as PVA/PAA copolymer by those skilled in the art.

When the gas to be separated G0 is carbon dioxide, as the gas carrier ($CO_2$ carrier) contained in the separation-functional layer 12, carbonates, bicarbonates, or hydroxides of an alkali-metal such as cesium carbonate ($Cs_2CO_3$) and rubidium carbonate ($Rb_2CO_3$), or amino acids such as glycine, 2,3-diaminopropionate (DAPA), alanine, arginine, asparagine, serine, ornithine, creatine, threonine, sarcosine, and 2-aminobutyric acid are preferably used.

The reaction of $CO_2$ with the $CO_2$ carrier by the facilitated transport mechanism is expressed by the following (Chemical Formula 1) as an overall reaction formula. It is to be noted that the (Chemical Formula 1) assumes that the $CO_2$ carrier is a carbonate. The symbol "⇔" in the reaction formula shown herein indicates that the reaction is a reversible reaction.

$$CO_2 + H_2O + CO_3^{2-} \Leftrightarrow 2HCO_3^- \quad \text{(Chemical Formula 1)}$$

Here, a reaction expressed by the above (Chemical Formula 1) occurs when the $CO_2$ carrier is a carbonate of an alkali metal, while a reaction expressed by the following (Chemical Formula 2) occurs when the $CO_2$ carrier is a hydroxide of an alkali metal. The (Chemical Formula 2) shows a case where the alkali metal is cesium as an example.

$$CO_2 + CsOH \rightarrow CsHCO_3 \cdot CsHCO_3 + CsOH \rightarrow Cs_2CO_3 + H_2O \quad \text{(Chemical Formula 2)}$$

The reactions in the above (Chemical Formula 2) can be united into a reaction expressed by the (Chemical Formula 3). That is, this shows that added cesium hydroxide is converted into cesium carbonate. Further, it is apparent from the above (Chemical Formula 2) that a similar effect can be obtained when as a $CO_2$ carrier, a bicarbonate is added in place of a carbonate of an alkali metal.

$$CO_2 + 2CsOH \rightarrow Cs_2CO_3 + H_2O \quad \text{(Chemical Formula 3)}$$

When the amino acid such as glycine and DAPA is used as the $CO_2$ carrier, it is known that carbon dioxide does not react with $NH_3^+$ and reacts with free $NH_2$. Therefore, when the amino acid such as glycine or DAPA is used as the $CO_2$ carrier, it is required to add an equivalent amount or more of base to the amino acid to deprotonate $NH_3^+$ dissolved in the cast solutions described later and convert it into $NH_2$. As the base, any base may be used as long as it is strongly basic enough to remove a proton from protonated $NH_3^+$ and convert it into $NH_2$, and a hydroxide or carbonate of an alkali metallic element can be suitably used.

In addition to the $CO_2$ carrier and the base as the deprotonating agent, a $CO_2$ hydration catalyst may be added to the gel layer of the hydrophilic polymer. In this case, a salt compound of oxo acid is preferably used as the $CO_2$ hydration catalyst. More specifically, for the $CO_2$ hydration catalyst, a salt compound of oxo acid of at least one element selected from group 6 elements, group 14 elements, group 15 elements and group 16 elements is used, and particularly preferably a tellurite compound, a selenite compound, an arsenite compound, an orthosilicate compound or a molybdate compound is used.

As the hydrophobic porous membrane constituting the first protective membrane 13, polytetrafluoroethylene (PTFE), polyethersulfone (PES), polypropylene (PP), polyethylene (PE), polyacrylonitrile (PAN), polysulfone (PS), polyethersulfone (PES), polyimide (PI), polyvinylidene fluoride (PVDF), and the like are preferably used. Furthermore, the porosity (void ratio) of the hydrophobic porous membrane is preferably 55% or more, and the pore size of the hydrophobic porous membrane is preferably within a range of 0.1 to 1 μm, and more preferably within a range of 0.1 to 0.5 μm.

The term "hydrophobic" means that the contact angle with water at 25° C. is 90° or more. In the present embodiment, the contact angle of the hydrophobic porous membrane is preferably 95° or more, more preferably 100° or more, and even more preferably 105° or more.

As the hydrophilic porous membrane 11, polycarbonate (PC), polycellulose-ester, polyether-ether-ketone (PEEK), the above-described hydrophobic porous membrane with hydrophilic treatment, and the like are preferably used. Furthermore, the porosity (void ratio) of the hydrophilic porous membrane 11 is preferably 55% or more, and the pore size of the hydrophilic porous membrane 11 is preferably within a range of 0.1 to 1 μm, and more preferably within a range of 0.1 to 0.5 μm.

The term "hydrophilic" means that the contact angle with water at 25° C. is less than 90°. In the present embodiment, the contact angle of the hydrophilic porous membrane 11 is preferably 45° or less.

As an important feature of the present separation apparatus 1, the selective permeable membrane 10 is fixed in the housing 20 such that the hydrophilic porous membrane 11 faces the first treatment chamber 21 side and the first protective membrane 13 of the hydrophobic porous membrane faces the second treatment chamber 22 side with respect to the separation-functional layer 12. As a result, when the gas to be separated G0 contained in the mixed gas FG supplied into the first treatment chamber 21 permeates through the selective permeable membrane 10, it permeates through the hydrophilic porous membrane 11, the separation-functional layer 12, and the first protective membrane 13 of the hydrophobic porous membrane in this order. As described above, in order to obtain a driving force for the gas to be separated G0 to permeate the separation-functional layer 12 from the first treatment chamber 21 side to the second treatment chamber 22 side, the pressure on the first treatment chamber 21 side is set to be higher than the pressure on the second treatment chamber 22 side, but according to the above-mentioned feature, the gel layer formed on the surface of the hydrophilic porous membrane does not penetrate into the pores of the hydrophilic porous membrane due to the pressure difference between the first and second treatment chambers since the hydrophilic porous membrane 11 is disposed on the first treatment chamber 21 side with respect to the separation-functional layer 12. This suppresses deterioration in gas permeance caused by the gel layer penetrating into the pores of the hydrophilic porous membrane when the gas to be separated G0 permeates through the selective permeable membrane 10.

As the feature of the present separation method, the present separation apparatus 1 is used to separate the gas to be separated G0 from the mixed gas FG by supplying the mixed gas FG containing the gas to be separated G0 to the first treatment chamber 21 and having the gas to be separated G0 permeate from the first treatment chamber 21 side to the second treatment chamber 22 side of the selective permeable membrane 10. By using the present separation apparatus 1, it is possible to achieve a remarkable effect by the features of the present separation apparatus 1 described above.

[Method for Manufacturing the Present Separation Apparatus]

Next, an embodiment of a method for manufacturing the present separation apparatus will be described. The method for manufacturing the present separation apparatus is roughly divided into a step of manufacturing the selective permeable membrane 10 and a step of fixing the manufactured selective permeable membrane 10 in the housing 20. First, one example of the manufacturing step of the selective permeable membrane 10 will be described.

In the following discussion, the separation-functional layer 12 serves as a facilitated $CO_2$ transport membrane, assuming that the $CO_2$ carrier and the $CO_2$ hydration catalyst are added to the gel layer of the hydrophilic polymer of the separation-functional layer 12. In addition, a crosslinked polyacrylic acid (manufactured by Sumitomo Seika Chemicals Co., Ltd.) AQUPEC HV-501 is used as the hydrophilic polymer, cesium hydroxide is used as the $CO_2$ carrier, and potassium tellurite is used as the $CO_2$ hydration catalyst. Furthermore, as the hydrophilic porous membrane 11, a hydrophilic PTFE porous membrane (manufactured by Sumitomo Electric Fine Polymer Inc., WPW-020-80, film thickness 80 μm, pore diameter 0.2 μm) is used, and as the hydrophobic porous membrane (the first protective membrane 13), a hydrophobic PTFE porous membrane (manufactured by Sumitomo Electric Fine Polymer Inc., HP-010-50, film thickness 50 μm, pore diameter 0.1 μm) is used.

First, the cast solution containing the hydrophilic polymer, the $CO_2$ carrier, and the $CO_2$ hydration catalyst is prepared (Step 1). More specifically, by way of example, 2.2 g of the crosslinked polyacrylic acid, 15.2 g of cesium hydroxide monohydrate, and 0.8 g of potassium tellurite are added to 87.3 g of pure water and stirred until dissolved to obtain the cast solution.

Next, the cast solution obtained in step 1 is cast on the hydrophilic PTFE porous membrane by an applicator (Step 2). The casting thickness in samples of examples and comparative examples described later is 500 μm.

Next, the hydrophilic PTFE porous membrane after casting is naturally dried at room temperature, and the cast solution is then gelled to produce a separation-functional layer (Step 3). Here, gelation means that the cast solution as a polymer dispersion liquid is dried into a solid form, and the gel layer is a solid layer produced by the gelation and is clearly distinguished from a liquid membrane. In the samples of the examples and the comparative example 1 to be described later, Step 2 and Step 3 are repeated.

In the manufacturing step described above, the cast solution is coated on the hydrophilic PTFE porous membrane in Step 2, and therefore the gel layer is not only formed on a surface (cast surface) of the hydrophilic PTFE porous membrane but also formed with being filled in pores in Step 3, so that defects (minute defects such as pinholes) are hard to occur, leading to an increase in film formation success rate of the gel layer. In FIG. 1, a state in which the gel layer of separation-functional layer 12 fills pores of the porous hydrophilic PTFE membrane of the hydrophilic porous membrane 11 is not illustrated.

Incidentally, in the above-described manufacturing step, although an example of using crosslinked polyacrylic acid as the hydrophilic polymer has been described, when PVA/PAA salt copolymer or polyvinyl alcohol is used as the uncrosslinked hydrophilic polymer in Step 1, the hydrophilic PTFE porous membrane which is naturally dried may be further thermally crosslinked at a temperature of about 120° C. for about 2 hours in Step 3. When the degree of crosslinking in the case of hydrogelling the hydrophilic polymer is adjusted by the addition of a crosslinking agent such as a dialdehyde compound or an aldehyde compound, the crosslinking agent is added to the cast solution in Step 1.

Next, the hydrophobic PTFE porous membrane (the first protective membrane 13) is laminated on the separation-functional layer 12 formed in Step 3 (Step 4), and the manufacturing step of the selective permeable membrane 10 is completed.

Next, the selective permeable membrane 10 manufactured through Steps 1 to 4 is fixed in the housing 20 by interposing a fluoro-rubber gasket as a sealing material such that the hydrophilic porous membrane 11 faces the first treatment chamber 21 side and the first protective membrane 13 of the hydrophobic porous membrane faces the second treatment chamber 22 side (Step 5), and the present separation apparatus 1 is manufactured. In the housing 20 used in Step 5, the first feeding port 21a and the first discharge port 21b are provided in advance in the first treatment chamber 21, and the second feeding port 22a and the second discharge port 22b are provided in advance in the second treatment chamber 22. The second feeding port 22a may be provided in the second treatment chamber 22 only when the sweep gas SG is used.

Incidentally, in the present separation method, in order to supply the mixed gas FG containing the gas to be separated G0 to the first treatment chamber 21, in the present separation apparatus 1 manufactured through Step 5, it is preferable to provide some sort of identification (indication by letters or marks, the difference in shape or size of the first treatment chamber 21 and the second treatment chamber 22, the difference in shape or size of the first feeding port 21 and the second feeding port 22a, the difference in shape or size of the first discharge port 21b and the second discharge port 22b, etc.) on the outside of the housing 20 (the outer wall, etc.) so that the first treatment chamber 21 and the second treatment chamber 22 are distinguishable from the outside of the housing 20. If the identification is provided, it is possible to prevent a mistake in supplying the mixed gas FG to the second treatment chamber 22. If the second treatment chamber 22 is not provided with the second feeding port 22a, the first treatment chamber 21 and the second treatment chamber 22 can be distinguished from each other from the outside of the housing 20 without the identification.

[Performance Evaluation of the Present Separation Apparatus (1)]

Next, the evaluation results of the membrane performance of the selective permeable membrane 10 to the sample S1 of the example of the present separation apparatus 1 and the sample C1 of the comparative example 1 of the present separation apparatus 1 will be described.

The respective selective permeable membranes 10 used in the sample S1 and the sample C1 have the separation-functional layer 12 that is a facilitated $CO_2$ transport membrane and are similarly manufactured through Steps 1 to 4 of the method for manufacturing the present separation apparatus. The difference between the sample S1 and the sample C1 is how the manufactured selective permeable membrane 10 is fixed in the housing 20. In the following experiments, a stainless-steel flow type gas permeation cell was used as the housing 20.

In the sample S1, the selective permeable membrane 10 is fixed to the flow type gas permeation cell such that the hydrophilic porous membrane 11 faces the first treatment chamber 21 side and the first protective membrane 13 of the hydrophobic porous membrane faces the second treatment chamber 22 side according to Step 5 of the method for manufacturing. On the other hand, in the sample C1, the selective permeable membrane 10 is fixed to the flow type gas permeation cell by interposing a fluoro-rubber gasket as a sealing material such that the hydrophilic porous membrane 11 faces the second treatment chamber 22 side and the first protective membrane 13 of the hydrophobic porous membrane faces the first treatment chamber 21 side. That is, in the sample S1 of the example, the gas to be separated G0 permeating the selective permeable membrane 10 passes through the hydrophilic porous membrane 11, the separation-functional layer 12, and the first protective membrane 13 in this order, but in the sample C1 of the comparative example 1, the gas to be separated G0 passes through the first protective membrane 13, the separation-functional layer 12, and the hydrophilic porous membrane 11 in this order, which is opposite to the sample S1.

Next, the experimental method for evaluating the membrane performance of the selective permeable membrane 10 of the respective samples S1 and C1 of the example and comparative example 1 will be described.

The evaluation conditions are common for each sample, the flow type gas permeation cell is installed in a thermostatic bath, the temperature in the cell is fixed at 110° C., and the relative humidity in the cell is 70%. The mixed gas FG supplied to the first treatment chamber 21 is a mixed gas consisting of $CO_2$, $N_2$, $H_2O$ (steam), and the gas to be separated G0 is $CO_2$. In this experiment, $H_2O$ (steam) is flowed as the sweep gas SG to the second treatment chamber 22.

In addition to the above-mentioned temperature and relative humidity, four conditions shown in Table 1 below were set for the total pressure (absolute pressure) of the mixed gas FG, the respective supply flow rates of $CO_2$, $N_2$, and steam in the mixed gas FG, the $CO_2$ partial pressure, and the steam flow rate of the sweep gas SG. The four conditions are conditions for evaluating the total pressure dependency of the gas permeation rate, and the temperature, the $CO_2$ partial pressure, and the relative humidity are made constant by changing the total pressure and the supply flow rate of $N_2$.

TABLE 1

|  | Condition 1 | Condition 2 | Condition 3 | Condition 4 |
| --- | --- | --- | --- | --- |
| Temperature (° C.) | 110 | 110 | 110 | 110 |
| Total pressure (kPa) | 200 | 400 | 600 | 800 |
| $CO_2$ supply flow rate (mol/min) | $4.5 \times 10^{-3}$ | $4.5 \times 10^{-3}$ | $4.5 \times 10^{-3}$ | $4.5 \times 10^{-3}$ |
| $N_2$ supply flow rate (mol/min) | $4.4 \times 10^{-3}$ | $2.2 \times 10^{-3}$ | $4.0 \times 10^{-3}$ | $5.8 \times 10^{-3}$ |
| Steam supply flow rate (mol/min) | $8.9 \times 10^{-3}$ | $8.9 \times 10^{-3}$ | $8.9 \times 10^{-3}$ | $8.9 \times 10^{-3}$ |
| $CO_2$ partial pressure (kPa) | 50 | 50 | 50 | 50 |
| Relative humidity (%) | 70 | 70 | 70 | 70 |
| Sweep gas flow rate (mol/min) | $8.9 \times 10^{-3}$ | $8.9 \times 10^{-3}$ | $8.9 \times 10^{-3}$ | $8.9 \times 10^{-3}$ |

The pressure on the second treatment chamber 22 side is atmospheric pressure. The respective pressures on the first and second treatment chamber 21 and 22 sides are adjusted by providing back pressure regulators downstream sides of cold traps in the discharge paths of the post-treatment gas EG and the discharge gas MG discharged from the first and second treatment chambers 21 and 22, respectively.

The gas permeated through the selective permeable membrane 10 of each sample S1 and C1 passes through the cold trap from the second treatment chamber 21, is collected in a container, and is quantified by gas chromatograph. An amount of gas permeated through the selective permeable membrane 10 of each sample S1 and C1 is small. Therefore, Ar is supplied into the container as a diluting gas at a predetermined flow rate in order to align $CO_2$ concentration within the measurement range of the gas chromatograph. The permeances of $CO_2$ and $N_2$ [mol/($m^2 \cdot s \cdot kPa$)] are calculated from the quantified results by the gas chromatograph and the Ar flow rate, and $CO_2/N_2$ selectivity is calculated from the ratio thereof.

Figure 2:
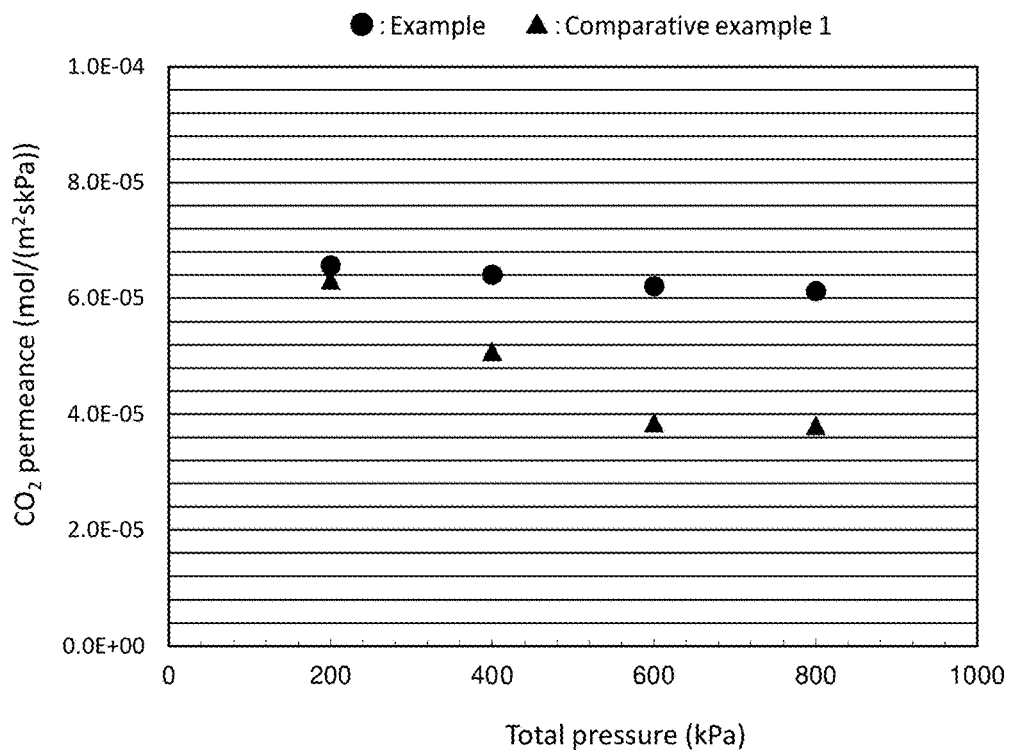
FIG. 2 is a graph showing the evaluation results of $CO_2$ permeance for sample S1 of the example and sample C1 of the comparative example 1.
Figure 3:
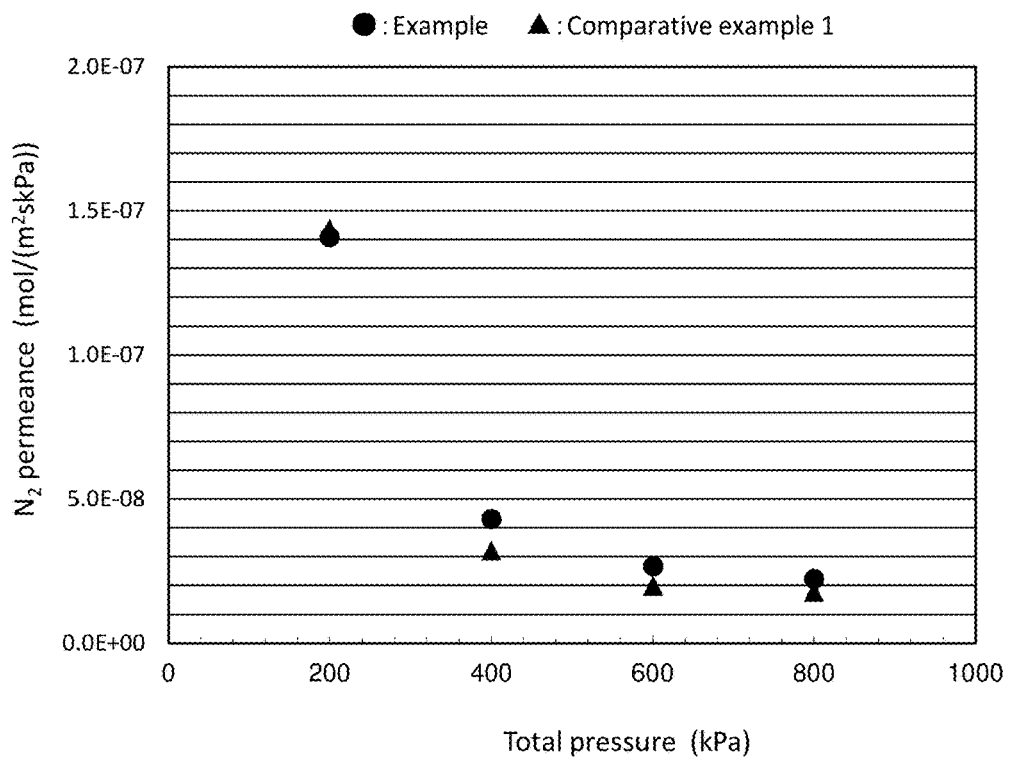
FIG. 3 is a graph showing the evaluation results of $N_2$ permeance for sample S1 of the example and sample C1 of the comparative example 1.
Figure 4:
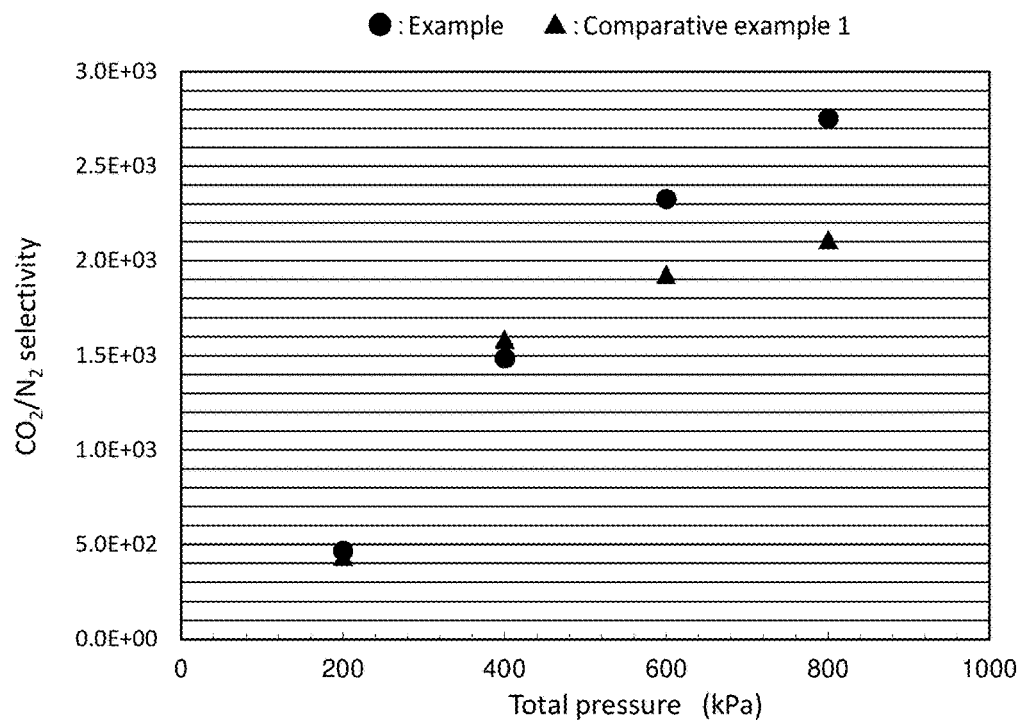
FIG. 4 is a graph showing the evaluation results of $CO_2/N_2$ selectivity for sample S1 of the example and sample C1 of the comparative example 1.

FIG. 2 to FIG. 4 show three types of membrane performances ($CO_2$ permeance, $N_2$ permeance, and $CO_2/N_2$ selectivity) measured in the above-described manner under the respective conditions 1 to 4. The total pressure is shown on the horizontal axis in each figure, and four sets of the total pressure correspond to the conditions 1 to 4 in order from the left. In FIG. 2 to FIG. 4, solid circles (●) indicate the respective membrane performances of the sample S1 of the example, and solid triangles (▲) indicate the respective membrane performances of the sample C1 of the comparative example 1.

From the measurement results of $CO_2$ permeance shown in FIG. 2, the $CO_2$ permeance decreases as the total pressure increases in the sample C1 of the comparative example 1. This shows that in the sample C1 in which the gas to be separated G0 passes through the first protective membrane 13, the separation-functional layer 12, and the hydrophilic porous membrane 11 in this order, as the total pressure increases, the gel layer of the separation-functional layer 12 penetrates into the pores of the hydrophilic porous membrane 11 of the support membrane so that the resistance of the gas permeation increases. On the contrary, in the sample S1 of the example in which the gas to be separated G0 passes through the hydrophilic porous membrane 11, the separation-functional layer 12, and the first protective membrane 13 in this order, it can be confirmed that the total pressure dependency of the $CO_2$ permeance is small.

On the other hand, according to the measurement results of $N_2$ permeance based on the solution-diffusion mechanism shown in FIG. 3, in both the sample S1 of the example and the sample C1 of the comparative example 1, $N_2$ permeance decreases with increasing the total pressure and the permeance of the sample S1 is slightly higher than the sample C1, but there is no large difference between the example and the comparative example 1.

From the measurement results of $CO_2$ permeance and $N_2$ permeance shown in FIGS. 2 and 3, as shown in FIG. 4, the $CO_2/N_2$ selectivity becomes higher in the sample S1 of the example than in the sample C1 of the comparative example 1 with increasing the total pressure.

Accordingly, in the sample S1 of the example, it is apparent that the deterioration of the gas-permeability performance caused by the penetration of the gel layer of the separation-functional layer 12 into the pores of the hydrophilic porous membrane 11 is effectively suppressed.

Furthermore, according to the measurement results of $CO_2$ permeance shown in FIG. 2, since the pressure on the second treatment chamber 22 side is atmospheric pressure, the difference in $CO_2$ permeance between the sample S1 of the example and the sample C1 of the comparative example 1 becomes remarkable when a pressure difference between the first treatment chamber 21 and the second treatment chamber 22 is 300 kPa or higher, and further increases at 500 kPa or higher. Thus, by adjusting the pressure difference between the first treatment chamber 21 and the second treatment chamber 22 to be equal to or higher than 300 kPa, preferably equal to or higher than 500 kPa, an effect that the deterioration in the gas permeance caused by the penetration of the gel layer into the pores of the hydrophilic porous membrane when the gas to be separated G0 permeates through the selective permeable membrane 10 is suppressed, which is unique to the present separation apparatus 1 and the present separation method using the present separation apparatus 1, can be remarkably exhibited.

[Performance Evaluation of the Present Separation Apparatus (2)]

Next, the evaluation results of the membrane performance of the selective permeable membrane 10 to the sample S2 of the example of the present separation apparatus 1 and the sample C2 of the comparative example 2 of the present separation apparatus 1 will be described.

The sample S2 of the example is manufactured through Steps 1 to 5 of the method for manufacturing the present separation apparatus in the same manner as the sample S1 of the above-described performance evaluation (1). Therefore, since the sample S2 and the sample S1 are the same, the explanation that overlaps with the sample S1 is omitted.

The selective permeable membrane used in the sample C2 of the comparative example 2 is similar to the selective permeable membrane 10 used in the sample S2 of the example in that the separation-functional layer is a facilitated $CO_2$ transport membrane and the first protective membrane is a hydrophobic porous membrane, but is different from the selective permeable membrane 10 used in the sample S2 in that the support membrane supporting the gel layer of the separation-functional layer is the hydrophobic porous membrane in the sample C2 while the support membrane used in the sample S2 is the hydrophilic porous membrane.

The manufacturing step of the selective permeable membrane of the sample C2 is different from Step 1 of the sample S2 in that 0.05 g of a surfactant (Surflon S-242 manufactured by AGC Seimi Chemical Co., Ltd.) is added to the cast solution used in Step 1 of the method for manufacturing the present separation apparatus (Step 1'), and is different from Step 1 of the sample S2 in that the cast solution obtained in Step 1' for the sample C2 is cast on the surface of the hydrophobic PTFE porous membrane instead of the hydrophilic PTFE porous membrane cast with an applicator (Step 2'). In Step 1', the surfactant is added to the cast solution in order to improve the film formability of the separation-functional layer on the hydrophobic PTFE porous membrane. It has been confirmed that when no surfactant is added, the cast solution is repelled on the surface of the hydrophobic PTFE porous membrane, and a uniform gel layer cannot be formed on the support membrane. Steps 3 and 4 for the sample C2 are the same as Steps 3 and 4 for the sample S2.

Subsequently, in the sample C2, the selective permeable membrane prepared through Steps 1', 2', 3, and 4 is fixed to the flow type gas permeation cell such that the support membrane of the hydrophobic porous membrane faces the second treatment chamber 22 side, and the first protective membrane of the hydrophobic porous membrane faces the first treatment chamber 21 side (Step 5'). That is, in the sample C2 of the comparative example 2, the gas to be separated G0 passes through the first protective membrane (hydrophobic porous membrane), the separation-functional layer, and the supporting membrane (hydrophobic porous membrane) in this order. Therefore, the degree to which the gel layer of the separation-functional layer penetrates into the pores of the hydrophobic porous membrane of the support membrane in the sample C2 is the same as the degree to which the gel layer of the separation-functional layer 12 penetrates into the pores of hydrophobic porous membrane of the first protective membrane in the sample S2 of the embodiment.

Next, the experimental method for evaluating the membrane performance of the selective permeable membrane of the sample S2 and C2 of the example and comparative example 2 will be described.

The evaluation conditions are common for each sample, the flow type gas permeation cell is installed in a thermostatic bath, the temperature in the cell is fixed at 110° C., and the relative humidity in the cell is 80%. The mixed gas FG supplied to the first treatment chamber 21 is a mixed gas consisting of $CO_2$, $N_2$, $H_2O$ (steam), and the ratio (mol %) among them is $CO_2:N_2:H_2O=34:53:13$. The gas to be separated G0 is $CO_2$. The supply flow rate of the mixed gas FG is $7.2 \times 10^{-2}$ mol/min and the total pressure (absolute pressure) of the mixed gas FG is 900 kPa.

On the other hand, the pressure on the second treatment chamber 22 side is atmospheric pressure. The mixed gas of $H_2O$ (steam) and Ar was used as the sweep gas SG flowing into the second treatment chamber 22. Its flow rate is $2.4 \times 10^{-2}$ mol/min and the ratio (mol %) among them is $H_2O:Ar=29:71$. The respective pressures on the first and second treatment chambers 21 and 22 sides are adjusted by providing back pressure regulators downstream of cold traps in the discharge paths of the post-treatment gas EG and the discharge gas MG discharged from the first and second treatment chambers 21 and 22, respectively.

The discharge gas MG, which is the mixed gas of sweep gas SG and the gas permeated through the selective permeable membrane of each sample S2 and C2, passes through the cold trap from the second treatment chamber 21, is collected in a container, and is quantified by gas chromatograph. The permeances of $CO_2$ [mol/(m²·s·kPa)] are calculated from the quantified results of the gas chromatograph and the Ar flow rate in the discharge gas MG.

Figure 5:
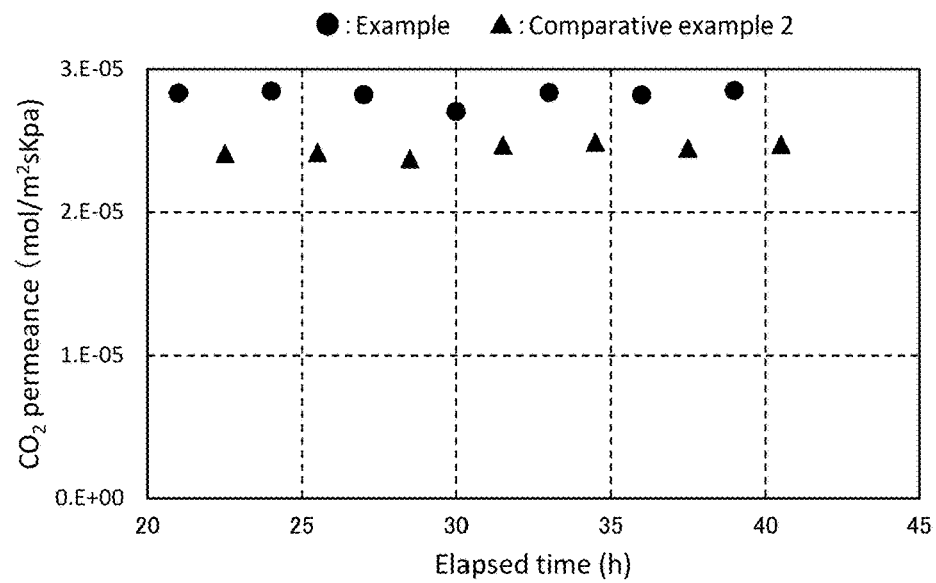
FIG. 5 is a graph showing the evaluation results of $CO_2$ permeance for sample S2 of the example and sample C2 of the comparative example 1.

FIG. 5 shows the measurement results of $CO_2$ permeance at a plurality of elapsed times from the start of the experiment in the above-described manner. The horizontal axis of FIG. 5 shows the elapsed time from the start of the experiment. Solid circles (●) indicate $CO_2$ permeance of the sample S2 of the example, and solid triangles (▲) indicate $CO_2$ permeance of the sample C2 of the comparative example 2.

From FIG. 5, $CO_2$ permeance of the sample S2 is higher than $CO_2$ permeance of the sample C2 over an elapsed time of about 20 hours to about 40 hours, averaging about 16% higher. It is considered that this is due to the following. In the sample C2 of the comparative example 2, since the surfactant is contained in the separation-functional layer 12, the surface of the hydrophobic PTFE porous membrane in contact with the separation-functional layer is hydrophilized and the separation-functional layer penetrates into the pores.

OTHER EMBODIMENTS

Other embodiments will be described below.

Figure 6:
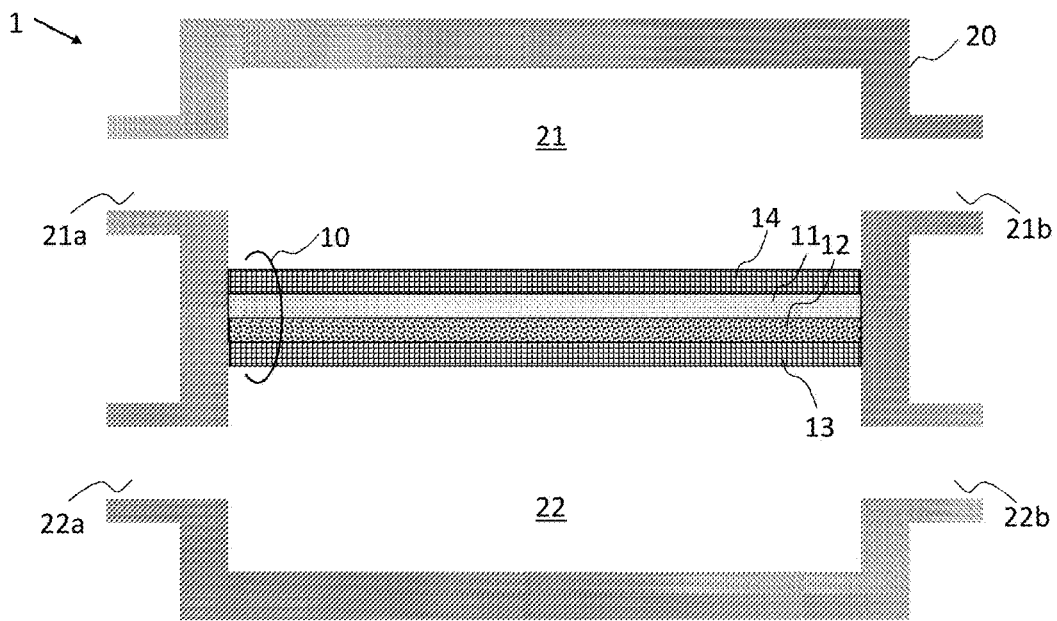
FIG. 6 is a cross-sectional view schematically illustrating a configuration of a gas separation apparatus according to another embodiment of the present invention.

<1> In the above embodiment, as shown in FIG. 1, the selective permeable membrane 10 has a three-layer structure in which the hydrophilic porous membrane 11, the separation-functional layer 12, and the first protective membrane 13 of the hydrophobic porous membrane are stacked in order, but as shown in FIG. 6, the selective permeable membrane 10 may have a four-layer structure in which the second protective membrane 14 of the hydrophobic porous membrane, the hydrophilic porous membrane 11, the separation-functional layer 12, and the first protective membrane 13 of the hydrophobic porous membrane are stacked in order.

The selective permeable membrane 10 of the four-layer structure is obtained by laminating the hydrophobic PTFE porous membrane (the first protective membrane 13) on the separation-functional layer 12 formed in Step 3 and the hydrophobic PTFE porous membrane (the second protective membrane 14) on the exposed surface of the hydrophilic PTFE porous membrane, which is the hydrophilic porous membrane 11, opposite to the cast surface in Step 4 of the above-described method for manufacturing the present separation apparatus. The second protective membrane 14 of the hydrophobic porous membrane is preferably the same hydrophobic porous membrane as the first protective membrane 13 but may be a different hydrophobic porous membrane. Then, in Step 5, the selective permeable membrane 10 of the four-layer structure produced in the Step 4 is fixed in the housing 20 in the same manner as the selective permeable membrane 10 of the three-layer structure to produce the present separation apparatus 1.

Even in the selective permeable membrane 10 of the four-layer structure, the key features of the present separation apparatus 1 described above, that is, the selective permeable membrane 10 is fixed in the housing 20 so that hydrophilic porous membrane 11 faces the first treatment chamber 21 side and the first protective membrane 13 of the hydrophobic porous membrane faces the second treatment chamber 22 side with reference to the separation-functional layer 12, is maintained as it is, thereby achieving the same effect as the selective permeable membrane 10 of the three-layer structure. Furthermore, in the selective permeable membrane 10 of the four-layer structure, the first treatment chamber 21 side of the hydrophilic porous membrane 11 is covered by the second protective membrane 14 of the hydrophobic porous membrane, so that water droplets can be prevented from adhering to the gel layer through the hydrophilic porous membrane and deteriorating the membrane performance.

<2> In the above embodiment, as shown in FIGS. 1 and 6, as the shape of the selective permeable membrane 10, a flat plate type in which the selective permeable membrane 10 in the form of a flat membrane is used as it is exemplified, but it may be a shape other than a flat plate type such as a cylindrical type in which the selective permeable membrane 10 has a cylindrical three-layer or four-layer structure, a spiral type in which one or more selective permeable membranes 10 in the form of a flat membrane having the 3-layer or 4-layer structure are spirally wound a plurality of times, or a pleat type in which one or more selective permeable membranes 10 in the form of a flat membrane having the 3-layer or 4-layer structure are folded in a bellows shape.

<3> In the above-described embodiment, although it is assumed that the gas to be separated G0 is $CO_2$ and the mixed gas FG to be supplied into the first treatment chamber 21 is a mixed gas consisting of $CO_2$, $N_2$, $H_2O$ (steam) for describing the performance evaluations of the present separation apparatus, the gas to be separated G0 is not limited to $CO_2$. For example, when the separation-functional layer 12 is a facilitated transport membrane, an acid gas such as $H_2S$, $SO_2$, and $NO_2$ is assumed as the gas to be separated G0. Furthermore, the gas species constituting the mixed gas FG including the gas to be separated G0 are not limited to the above-described combination gas species. When the separation-functional layer 12 is a facilitated transport membrane, as the gas species other than the gas to be separated G0 and $H_2O$ (steam), $H_2$, $CH_4$, $O_2$, CO or the like that permeates only by the solution-diffusion mechanism is assumed in addition to $N_2$. The separation-functional layer 12 including a gel layer of a hydrophilic polymer containing water is mainly supposed to be a facilitated transport membrane, but the separation-functional layer including a gel layer of a hydrophilic polymer containing water is not necessarily limited to a facilitated transport membrane.

<4> In the above embodiment, as one example of the manufacturing step of the selective permeable membrane 10 in which the separation-functional layer 10 is a facilitated $CO_2$ transport membrane, the cast solution containing a hydrophilic polymer, a $CO_2$ carrier, and a $CO_2$ hydration catalyst is prepared (Step 1), the cast solution obtained in Step 1 is cast on the surface of the hydrophilic PTFE porous membrane (Step 2), and the hydrophilic PTFE porous membrane after casting is naturally dried at room temperature, and then the cast solution is gelled (Step 3). In Step 1, a cast solution not containing either one or both of a $CO_2$ carrier and a $CO_2$ hydration catalyst may be prepared, and the gel layer obtained in Step 3 may be impregnated with an aqueous solution containing the either one or both of a $CO_2$ carrier and a $CO_2$ hydration catalyst to form the separation-functional layer 12. Furthermore, in the above-mentioned example of the manufacturing step of the selective permeable membrane 10, a $CO_2$ hydration catalyst is added to the gel layer of the hydrophilic polymer, but the $CO_2$ hydration catalyst may be added as needed.

<5> In the above embodiment, the mixed gas FG containing the gas to be separated G0 is supplied into the first treatment chamber 21 from the outside via the first feeding port 21a. However, instead of supplying the mixed gas FG from the outside, the mixed gas FG may be generated in the first treatment chamber 21 by the reaction of a source gas (a mixed gas containing a gas other than the gas to be separated G0) supplied from the outside into the first treatment chamber 21. Even when the mixed gas FG is generated in the first treatment chamber 21, the key features of the present separation apparatus 1 described above, that is, the selective permeable membrane 10 is fixed in the housing 20 so that the hydrophilic porous membrane 11 faces the first treatment chamber 21 side and the first protective membrane 13 of the hydrophobic porous membrane faces the second treatment chamber 22 side with reference to the separation-functional layer 12, is maintained as it is. Therefore, the same effect is exhibited as when the mixed gas FG is supplied from the outside into the first treatment chamber 21.

Next, as an exemplary implementation in which the mixed gas FG is generated in the first treatment chamber 21, a $CO_2$ permeation membrane reactor in which a CO shift converter is provided in the first treatment chamber 21 will be briefly described. In this case, the gas to be separated G0 is $CO_2$, and the separation-functional layer 12 is a facilitated $CO_2$ transport membrane described above.

For example, when a $CO_2$ permeable membrane reactor is formed using the present separation apparatus 1 shown in FIG. 1, the first treatment chamber 21 is filled with a CO shift catalyst, and the first treatment chamber 21 is formed as the CO shift converter.

The $CO_2$ permeable membrane reactor is, for example, an apparatus in which a source gas containing $H_2$ as a main component generated by a steam reformer is supplied into the first treatment chamber 21a filled with the CO shift catalyst, and carbon monoxide (CO) contained in the source gas is removed through a CO shift reaction shown below (Chemical Formula 4). In the first treatment chamber 21, a mixed gas FG of $CO_2$, $H_2$, and $H_2O$ is generated from the source gas (a mixed gas of CO, $H_2$, and $H_2O$) supplied into the first treatment chamber 21 by the CO shift reaction. $CO_2$ which is the gas to be separated G0 in the generated mixed gas FG is allowed to permeate selectively from the first treatment chamber 21 side to the second treatment chamber 22 side of the present separation apparatus 1 and removed, whereby chemical equilibrium of the CO shift reaction can be shifted to the hydrogen production side, so that CO and $CO_2$ can be removed beyond the limit imposed by equilibrium restriction with a high conversion rate at the same reaction temperature. Then, a post-treatment gas EG containing $H_2$ as a main component after removing CO and $CO_2$ is extracted from the first treatment chamber 21.

$$CO+H_2O \Leftrightarrow CO_2+H_2 \qquad \text{(Chemical Formula 4)}$$

The CO shift catalyst to be filled into the first treatment chamber 21 is not limited to a particular catalyst, and various catalysts are available. The sweep gas SG supplied into the second treatment chamber 22 may be used as needed, and as the gas species used for the sweep gas SG, $H_2O$ (steam), an inert gas, or the like may be suitably used, as described above.

<6> The mixing ratio of the components in the composition of the separation-functional layer 12 of the selective permeable membrane 10, the pore size, the porosity, the film thickness, and the like of the hydrophilic porous membrane 11 and the first protective membrane 13, which are exemplified in the above embodiments, are examples for easy understanding of the present invention, and are not limited to the exemplified numerical values of the selective permeable membrane 10.

INDUSTRIAL APPLICABILITY

The gas separation apparatus and the gas separation method according to the present invention can be used to selectively separate a gas to be separated from a mixed gas containing the gas to be separated by using a selective permeable membrane including a separation-functional layer that is selectively permeable to the gas to be separated.

DESCRIPTION OF SYMBOLS

1: gas separation apparatus
10: selective permeable membrane
11: hydrophilic porous membrane
12: separation-functional layer
13: first protective membrane (hydrophobic porous membrane)
14: second protective membrane (hydrophobic porous membrane)
20: housing
21: first treatment chamber
21a: first feeding port
21b: first discharge port
22: second treatment chamber
22a: second feeding port
22b: second discharge port
FG: mixed gas
EG: post-treatment gas
MG: discharge gas
PG: permeated gas
SG: sweep gas

The invention claimed is:

1. A gas separation method comprising:
using a gas separation apparatus comprising a selective permeable membrane provided with a separation-functional layer that is selectively permeable to a gas to be separated, and a first treatment chamber and a second treatment chamber separated by the selective permeable membrane, and
supplying a mixed gas containing the gas to be separated to the first treatment chamber or generating the mixed gas in the first treatment chamber, and separating the gas to be separated from the mixed gas by having the gas to be separated permeate from a first treatment chamber side of the selective permeable membrane to a second treatment chamber side of the selective permeable membrane, wherein
the selective permeable membrane has a laminated structure in which a hydrophilic porous membrane, the separation-functional layer supported by the hydrophilic porous membrane, and a first protective membrane of a hydrophobic porous membrane laminated on the separation-functional layer are stacked in order,
the separation-functional layer includes a gel layer of a hydrophilic polymer containing water, and
the first treatment chamber is provided on a hydrophilic porous membrane side of the selective permeable membrane, and the second treatment chamber is provided on a first protective membrane side of the selective permeable membrane.

2. The gas separation method according to claim 1, wherein the first treatment chamber side of the hydrophilic porous membrane is covered with a second protective membrane made of a hydrophobic porous membrane.

3. The gas separation method according to claim 1, wherein the hydrophobic porous membrane includes at least any one of polytetrafluoroethylene, polyethersulfone, polypropylene, polyethylene, polyacrylonitrile, polysulfone, polyethersulfone, polyimide, and polyvinylidene fluoride.

4. The gas separation method according to claim 1, wherein the hydrophilic porous membrane includes at least any one of polycarbonate, a polycellulose-ester, polyether-ether-ketone, and the hydrophobic porous membrane with hydrophilic treatment.

5. The gas separation method according to claim 1, wherein the hydrophilic polymer is a polymer including polyacrylic acid as a main component.

6. The gas separation method according to claim 1, wherein
the gas to be separated is carbon dioxide, and
the separation-functional layer is a facilitated $CO_2$ transport membrane including a $CO_2$ carrier that selectively reacts with carbon dioxide in the mixed gas in the gel layer.

7. The gas separation method according to claim 1, wherein a pressure difference between the first treatment chamber and the second treatment chamber is adjusted to be equal to or greater than 300 kPa.

8. A gas separation apparatus comprising:
a selective permeable membrane provided with a separation-functional layer that is selectively permeable to a gas to be separated, and
a first treatment chamber and a second treatment chamber separated by the selective permeable membrane, wherein
the gas separation apparatus is configured to supply a mixed gas containing the gas to be separated to the first treatment chamber or to generate the mixed gas in the first treatment chamber, and to separate the gas to be separated from the mixed gas by having the gas to be separated permeate from a first treatment chamber side of the selective permeable membrane to a second treatment chamber side of the selective permeable membrane,
the selective permeable membrane has a laminated structure in which a hydrophilic porous membrane, the separation-functional layer supported by the hydrophilic porous membrane, and a first protective membrane of a hydrophobic porous membrane laminated on the separation-functional layer are stacked in order,
the separation-functional layer includes a gel layer of a hydrophilic polymer containing water, and
the first treatment chamber is provided on a hydrophilic porous membrane side with respect to the separation-functional layer of the selective permeable membrane, and the second treatment chamber is provided on a first protective membrane side with respect to the separation-functional layer of the selective permeable membrane.

9. The gas separation apparatus according to claim 8, wherein the first treatment chamber side of the hydrophilic porous membrane is covered with a second protective membrane made of a hydrophobic porous membrane.

10. The gas separation apparatus according to claim 8, wherein the hydrophobic porous membrane includes at least any one of polytetrafluoroethylene, polyethersulfone, polypropylene, polyethylene, polyacrylonitrile, polysulfone, polyethersulfone, polyimide, and polyvinylidene fluoride.

11. The gas separation apparatus according to claim 8, wherein the hydrophilic porous membrane includes at least any one of polycarbonate, a polycellulose-ester, polyether-ether-ketone, and the hydrophobic porous membrane with hydrophilic treatment.

12. The gas separation apparatus according to claim 8, wherein the hydrophilic polymer is a polymer including polyacrylic acid as a main component.

13. The gas separation apparatus according to claim 8, wherein
the gas to be separated is carbon dioxide, and
the separation-functional layer is a facilitated $CO_2$ transport membrane including a $CO_2$ carrier that selectively reacts with carbon dioxide in the mixed gas in the gel layer.

14. The gas separation apparatus according to claim 8, comprising a pressure adjusting device that adjusts a pressure difference between the first treatment chamber and the second treatment chamber to be equal to or higher than 300 kPa.

15. The gas separation apparatus according to claim 8, wherein an identification mark is provided on an outer side of a housing constituting the first treatment chamber and the second treatment chamber so that the first treatment chamber and the second treatment chamber can be distinguished from the outside.

16. The gas separation apparatus according to claim 8, wherein the first treatment chamber includes a catalyst for advancing a reaction of generating the mixed gas containing the gas to be separated from a source gas supplied to the first treatment chamber.

* * * * *